United States Patent
Dershem (12) 
(10) Patent No.: US 12,555,653 B2
(45) Date of Patent: *Feb. 17, 2026

(54) DIGITAL HEALTHCARE CAPTURE INTAKE DATA FOR COVID-19 AND OTHER SIGNIFICANT EVENTS

(71) Applicant: Michael Dershem, Voorhees, NJ (US)

(72) Inventor: Michael Dershem, Voorhees, NJ (US)

(*) Notice: Subject to any disclaimer, the term of this patent is extended or adjusted under 35 U.S.C. 154(b) by 696 days.

This patent is subject to a terminal disclaimer.

(21) Appl. No.: 17/903,391

(22) Filed: Sep. 6, 2022

(65) Prior Publication Data

US 2022/0415460 A1    Dec. 29, 2022

Related U.S. Application Data

(63) Continuation-in-part of application No. PCT/US2021/023012, filed on Mar. 18, 2021, and a continuation-in-part of application No. 16/873,917, filed on Aug. 12, 2020, now abandoned.

(51) Int. Cl.
*G16H 10/60* (2018.01)
*G06Q 20/38* (2012.01)

(52) U.S. Cl.
CPC ........... *G16H 10/60* (2018.01); *G06Q 20/389* (2013.01)

(58) Field of Classification Search
CPC ...... G16H 10/60; G16H 40/20; G06Q 20/389; G06Q 2220/00; G06Q 20/102
See application file for complete search history.

(56) References Cited

U.S. PATENT DOCUMENTS

| | | | |
|---|---|---|---|
| 9,141,758 B2 * | 9/2015 | Kress | G06F 16/00 |
| 2010/0217973 A1 * | 8/2010 | Kress | G06F 21/6254 |
| | | | 713/153 |
| 2013/0262139 A1 * | 10/2013 | Salahuddin | G16H 10/60 |
| | | | 705/2 |
| 2017/0293723 A1 * | 10/2017 | Friesen | G06Q 10/10 |
| 2023/0317224 A1 * | 10/2023 | Prajapati | G06Q 20/363 |
| | | | 705/51 |

* cited by examiner

*Primary Examiner* — Beemnet W Dada (57) ABSTRACT

Gateways for patient-responsibility portions of medical bills (PRPMB) transactions, regardless of healthcare provider or merchant services (Credit card processing) provider are disclosed, which also provide big data analytics and interoperability across systems and networks. These principles provide uniform, consistent and secure devices, methods and systems that allow a patient to make PRPMB payments on one website or by one phone call or physical address regardless of the entity that is due payment, or when multiple entities are due payment and allow or the use of cryptocurrencies as well as prescription escrows, as well as data gathering and analytical techniques for combatting the COVID-19 pandemic.

20 Claims, 5 Drawing Sheets

10

PATIENT BILL

20 — PATIENT NAME ADDRESS

30 — DIAGNOEIS: SERVICES: DATE;

30 — PROVIDER NAME ADDRESS

35 — AMOUNT PAID BY INSURANCE −$XXX.XXX

40 — AMOUNT DUE $XXXX.XXX

PLEASE REMIT TO: — 50
XXXXXX
XXXXXX (PRPMS)

60
UNIQUE PATIENT IDENIFIER
−> ABLDEFAA
PAY AT −>
www.mapay.com

70
SMART TAG
~~~

DIGITAL HEALTHCARE CAPTURE INTAKE DATA FOR COVID-19 AND OTHER SIGNIFICANT EVENTS

FIELD OF THE DISCLOSURE

The principles disclosed herein relate generally to payment for medical services. More specifically, the principles disclosed herein relate to screening and capturing patient or consumer data safely in conjunction with automated payment systems and data gathering tech.

BACKGROUND

Today there exist many ways for a patient to make payment to an individual healthcare provider from which the patient may have had services performed and for which a balance is due. This balance may be due because the patient has a balance after a third party (e.g. insurance company, Medicare, Medicaid) has made their portion of payment responsibility; or it could be a co-pay; or the patient has assumed all financial responsibility of services rendered by the healthcare provider (e.g. Doctor, hospital, clinic). These payments, called "patient-responsible portions of medical bills" (PRPMB) can be made by check, credit card, debit card, money orders in person, via the mail, over the phone or over the internet. For the insurance carriers and government program payment providers, there already exists "clearing houses" that provide mechanisms to aggregate payments to providers, but not such systems exists for aggregating PRPMBs for patients.

There are many issues that exist in the current methods for paying the PRPMB. One such problem is that every provider must be paid directly for their own unique services rendered to the patient. For instance, many unique services are provided to a sick child when a responsible party takes the child to the local Emergency Room. After being triaged the child is seen by a physician contracted to the ER. The child might need to get x-rays. The child is then subsequently released after an overnight stay and sees the pediatrician for follow-up.

After all of these and other services are rendered, the responsible party would then receive separate billing statements from each individual service provider requesting payment. After insurance pays its obligations to the individual providers, should the responsible party want to pay the PRPMB the individual providers online via a credit card, the patient would go on to the providers' own websites or a separate payment page that is given on the patient's billing statement. Often times the patient will need to set up an account through these individual entities' websites. Once the time consuming activity of setting up the account is completed, the patient can then place their payment over the website and the payment is accepted. This transaction is processed by the merchant services provider of the unique medical provider. Thus, if this responsible party had seven different statements she would need to do this seven times, even though this may be the only and last time of any interaction with a particular medical provider.

Other difficult issues exist in the healthcare industry, many surrounding the lack of uniform Practice Management Systems (PMS), which are the transactional systems that most of the industry uses to collect patient data and to submit claims. These are usually legacy systems that are utilized by nearly every healthcare provider and have a well-entrenched install base built on old DOS platforms and newer virtualization platforms. They do not interact, interface or communicate with each other and the disparate vendors that run and service them do not allow or even want this to happen. Other stakeholders such as insurance payers, healthcare institutions, and government entities rely on these systems, and/or information from these systems, but again these types of institutions do not allow others to use or even approach what they perceive as their data which might be gathered by these PMS.

For decades, leaders of the healthcare industry and other various stakeholders have spoken at great length relative to the notion of achieving healthcare interoperability of PMS and other systems. In healthcare, interoperability is the ability of different information technology systems and software applications to communicate, exchange data, and use the information that has been exchanged. Data exchange schema and standards should permit data to be shared across clinicians, labs, hospitals, pharmacies, and patients regardless of the application or application vendor. Interoperability means the ability of health information systems to work together within and across organizational boundaries in order to advance the effective delivery of healthcare for individuals and communities. There are three levels of health information technology interoperability: 1) Foundational; 2) Structural; and 3) Semantic.

Today the issues around interoperability go far beyond technical constraints, and they are also fraught with social, political, geographical, and business constraints. Without a forced government mandate, interoperability may not be achievable and the long felt need to use "big data", the process of examining large and varied data sets to uncover hidden patterns, unknown correlations, market trends, customer preferences and other useful information that can help organizations make more-informed business decisions, in healthcare could not be possible.

Another significant issue that has recently become more critical is in relation to the urgent healthcare landscape to remediate the Novel COVID-19 infection and impact. There is an increasing need for healthcare providers, including hospitals, physician practices, pharmacies and other medical institutions, to require a quick, non-physical way to screen and capture consumer/patient data safely. This information is not readily asked in the electronic health record (HER) systems. Such screenings have become increasingly and needed on a timely basis in order to provide correct treatment, while protecting the safety of the medical community. The HER screenings must also be dynamic to adjust to changing needs based on specific information requirements by federal, state, local governments and other institutions. Such needs have not heretofore been met in the art.

There is a need for systems, devices and methods to solve the aforementioned needs in the art, and other related needs. The art has not heretofore solved these problems.

SUMMARY

The principles disclosed herein provide gateways for PRPMB transactions, regardless of the healthcare provider or merchant services (Credit card processing) provider. These principles provide uniform, consistent and secure devices, methods and systems that allow a patient to make PRPMB payments on one website or by one phone call or physical address regardless of the entity that is due payment, or when multiple entities are due payment.

The present principles include, but are not limited to, a patient billing record which will be issued by an entity responsible for collecting from a patient amounts owed for healthcare services rendered to the patient comprising; a field indicating a provider of the healthcare services rendered by the provider to the patient, a field indicating the healthcare services rendered to the patient by the healthcare provider, a field indicating a date on which the healthcare services were rendered to the patient, a field indicating an amount paid for the services by an entity other than the patient, a field indicating a PRPMB which is remaining due after the amount paid for the services by an entity other than the patient, and a field providing a unique patient identifier which identifies the patient and allows an entity which collects the PRPMB to electronically identify the patient and that the patient owes the PRPMB.

The present principles also include, but are not limited to, methods and gateways for allowing a patient to pay PRPMBs which are remaining due after an amount paid for healthcare services by an entity other than the patient; comprising; a processor configured to aggregate how many healthcare service providers must be paid a portion of the PRPMB that is associated with a bill that the patient receives and which are further uniquely identified with the patient through a unique patient identifier on the bill, and which will determine how the PRPMB is to be distributed if more than one healthcare service provider is due a portion of the PRPMB uniquely associated with the patient, and a processor configured to receive medical bill records associated with the healthcare service providers and for which PRPMB is due and to provide routing information to the gateway so that the PRPMB can be allocated amongst the healthcare service providers after the aggregator processor determines that PRPMB are due to healthcare service providers from patients with unique identifiers. The unique identifiers also provide an additional data field for data gathering to provide interoperability across networks. The use of cryptocurrencies is disclosed for making the processed payments.

In view of the recent pandemic of the coronavirus and COVID-19 outbreak, as well as other virulent disease outbreaks, data from patient intake screenings will be collected, collated and sent online to the provider, as well as captured for use by any worldwide governments worldwide, the World Health Organization (WHO), and any other identified health organizations in need of this real-time collection of patient data. The benefit of secure, non-physical digital healthcare data capture is urgent and significant during the present novel COVID-19 pandemic and can be a universal approach to regular or notable events for all healthcare providers, government border agencies, hospital systems, pharmacies and other healthcare industry institutions.

The present principles will be best understood by those with skill in the art by reading the following Detailed Description in conjunction with the drawings which are first described briefly below.

DETAILED DESCRIPTION

Figure 1:
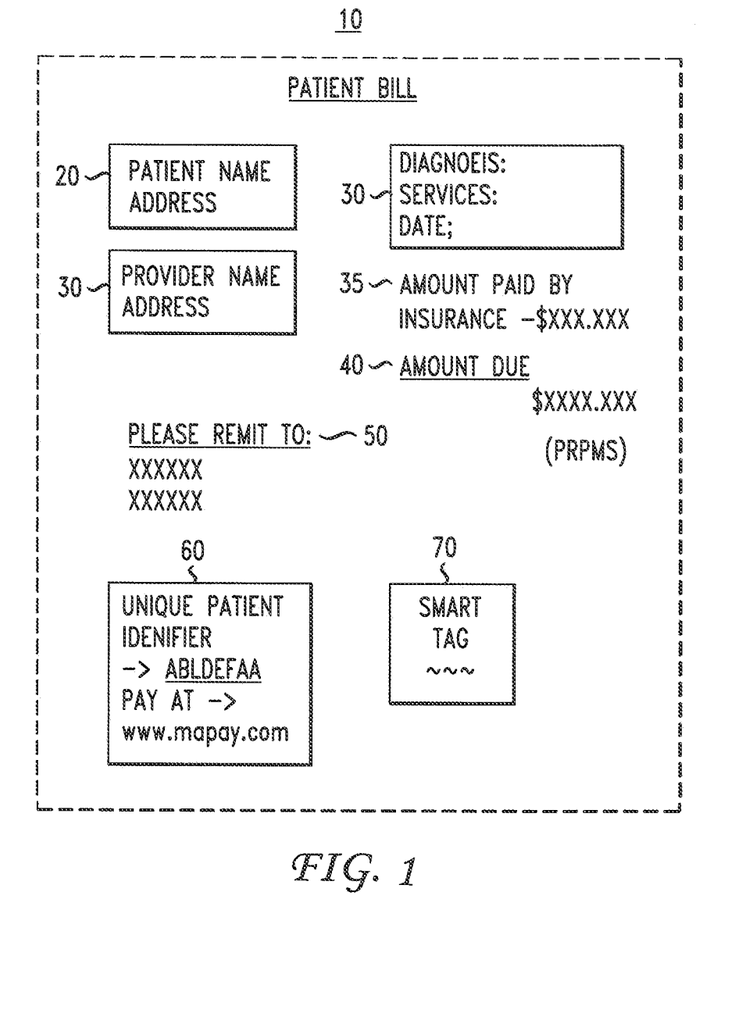
FIG. 1 is a drawing of medical bill or statement for a patient detailing PRPMBs due, and the patient's unique identifier that can be used to satisfy the PRPMBs.

Referring now to the drawings wherein like reference numerals refer to like elements, FIG. 1 illustrates patient bill or statement 10. As is traditional, the bill 10 has the patient name and address 20, the medical provider's name and address 30, the diagnosis and services rendered, as well as the date rendered 30, and the amount paid 35 by insurance providers, government providers or any other entity other than the patient that is responsible for at least a portion of the amount owed for the services. It will be appreciated that a patient could receive many such bills from different providers for many different types of services. There exist today billing companies and other entities that aggregate such bills and send monthly bills and statements to patients on behalf of medical service providers that contract with the billing companies to perform billing services. Thus, bill 10 could contain the aforementioned information for one medical provider, or a plurality of medical providers, all of which require payment from the patient and other entities, for example insurance companies, for medical services rendered.

In all such instances, a PRPMB 40 will be shown on the bill 10. Typically, an indication 50 will also be provided setting forth the place to which the payment should be remitted, for example an address, wire transfer account number, bank, etc. Also, the method of payment, for example, credit card, check, etc. will also be delineated. In accordance with the present principles, the bill 10 will also be provided with an indication 60 of paying the PRPMB 40 through the use of a smart tag 70 or other electronic-recognizable media 70, such as a QR or bar code, as well as a unique patient identifier 80, which sets forth, at least for billing and payment purposes, a set of numbers, characters or a combination thereof, which the present systems, devices and methods can use to uniquely identify a patient for which PRPMBs are due. When the unique patient identifier 80 or smart tag 70 is used, it is then very simple and straightforward for the patient to go to a website 90 indicated in indicator 60, called www.mapay.com, which is a website or gateway that will allow processing of the PRPMBs in accordance with the present principles.

Figure 2:
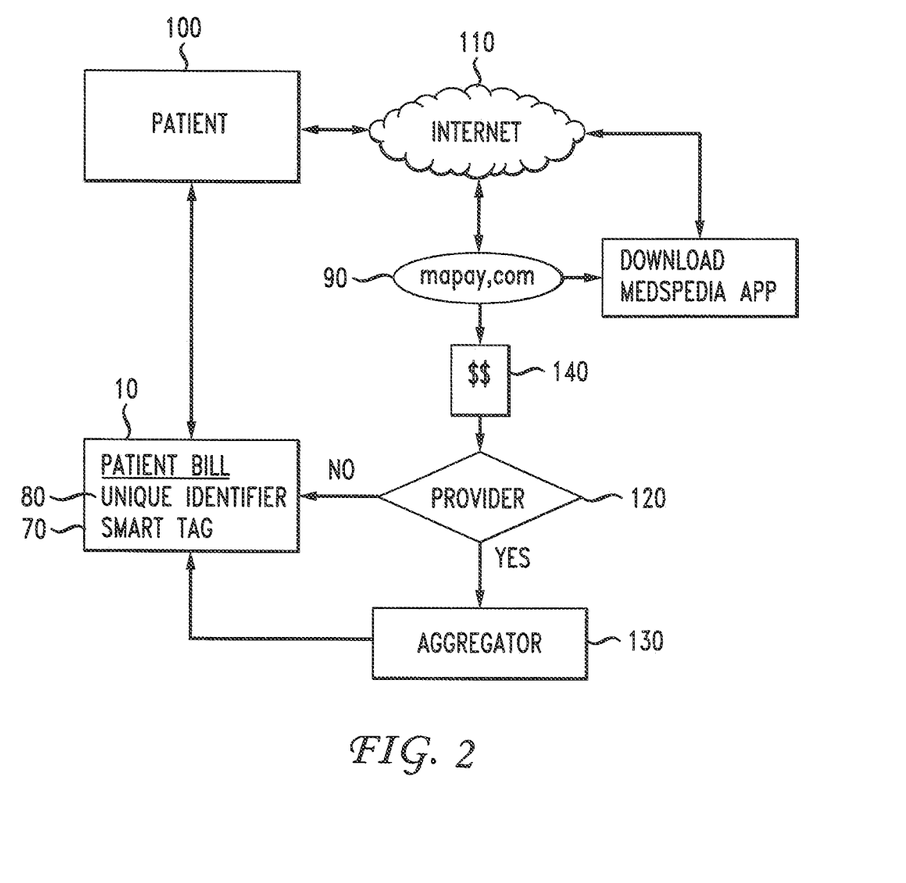
FIG. 2 is a block diagram of a system through which the patient can satisfy the PRPMB.

Every healthcare related patient billing statement 10 would have a unique statement number/identifier/SmartTag 70, 80 as shown in FIG. 1. Referring now to FIG. 2, patients 100 and medical providers 120 (or billing companies contracted by medical providers 120) can interact with the gateway 90 through a network 110, such as the Internet. It will be appreciated that the network 110 would be a secure network, a virtual private network or a network specifically implemented for the purposes of the present principles. A medical provider 120, billing company contracted by medical providers, statement processor, or other entity that prepares and sends bills and statements to the patient 100 would opt into the gateway 90, for example on a monthly basis, to upload bills 10 to gateway 90 having the unique statement identifiers 80 (or SmartTags 70) which could be generated by the medical providers' practice management systems, or billing companies contracted by the medical providers. Should the possibility exist that there are produced duplicate unique identifiers 80 or SmartTags 70, the gateway 90 will have secondary information, billing amount, last name, etc. to assure correct payment to the statement.

Preferably, gateway 90 comprises an aggregator function 130 which allows the gateway 90 to determine how many providers must be paid the PRPMB from the bills 10, and which will determine how the patient's payments should be allocated. The patient 100 will log in to mapay.com 90 with a password, for example, and the aggregator 130 will associate the patient with its bills. As it is a strong possibility that the patient 100 will not make full payment for all of the PRPMBs that are due, the patient can allocate how much of his payment should go to individual medical providers, or the aggregator can make that decision based on other criteria if the patient does not specify amounts. The amounts paid this way may be pro rata amounts, or each medical provider may have a separate agreement with the owner of the gateway 90 for payment percentages from patients. All such possibilities and equivalents may be implemented by aggregator 130.

The gateway 90 will then route payment 140 to the medical provider's merchant services account and/or regular bank if it is a check, health savings account or crypto currency. The crypto currency would have an auto-conversion feature to allow the funds to be dispersed in regular currency. Now the patient on one website could log on and make all payments at once regardless of how rendered service. The gateway would also have the capabilities for a provider to opt in for pre-authorized payment plans as a convenience for the patient. Each statement would reflect an automated payment plan whereby the balance would be paid over a series of subsequent payments. The gateway 90 itself, the merchant services account operator of the medical provider, or the merchant services account operator of the gateway mapay.com 90 can send the medical service provider the full amount due, or a percentage amount due if the patient has not paid the entire bill, and then either charge a fee which can be passed through to the owner of gateway 90, or a small percentage of the amount paid to the owner of the gateway 90 for the services the gateway 90 provides in this payment process and method. Alternatively, gateway 90 may send transactions directly through the merchant services account of the medical provider 120.

Advantageously, billing companies, practice management system providers, large integrated healthcare networks, government entities, insurance carriers, and individual providers may opt to brand (white label) their own provider's payment sites which may all then ultimately be processed by the gateway 90 having the appropriate service platform designed for their uses. The present principles are modifiable to accommodate all such needs.

Figure 3:
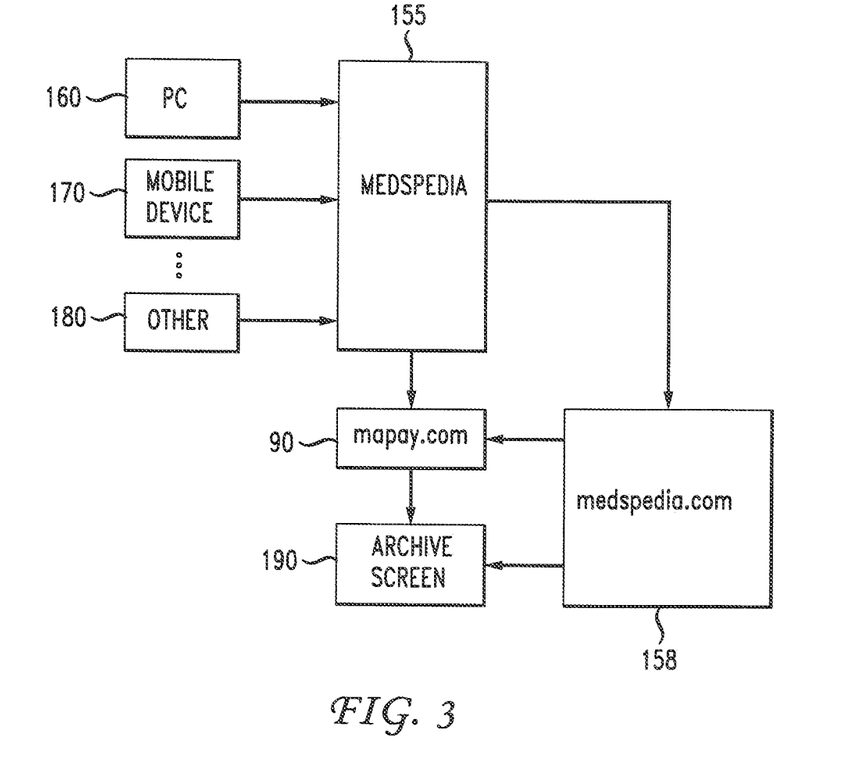
FIG. 3 is a block diagram of a system showing an app that can interact with the system of FIG. 2.

Additionally the gateway 90 may implement a prepaid or "fast track" stored valued, linked to a Health Savings Accounts or credit card through an application ("app") that is designed for use by a patient 100 in handheld, mobile, computer of other device. Referring to FIG. 3, an app 155 is illustrated and is herein denoted as "MEDspeedia". MEDspeedia 155 is preferably a consumer side website, www.medspeedia.com 158, and allows for the patients to provide MEDspeedia account information to providers for payments to be drawn from upfront or after services rendered. This integrated app will allow for loading of personal medical providers 120 of the patient and/or search for these providers so that PRPMBs which are owed to them can be paid by the patient. Providers 120 may opt in to allow payments from MEDspeedia app 155 by providing routing information to the MEDspeedia website while not opting to have patient statements part of the gateway 90. It will also allow scanning any SmartTag 70 for payments, for example through a barcode reader, QR (quick response) reader.

The MEDspeedia app 155 may also interface alternatively with the mapay.com gateway 90 if it is desired to integrate the services provided by the gateway 90. Otherwise, it is possible that medspeedia.com 158 will provide all of the necessary functionality for the patients 100 to interact with the providers to pay their PRPMBs. The Medspeedia app 155 may reside on a PC 160 or any type of desktop or laptop computer, on a mobile device 170 such as a Table or cell phone, or on any other type of device 180 which can process Medspeedia's data and transactions. Patients 100 and other users will be able to store and archive payment transactions 190 which are then viewable visually through a screen or which can be otherwise accessed and sent for review, even those not processed through www.mapay.com, gateway 90, and can easily pull this information to send to medical providers or others should there be a dispute or question concerning any transaction. Today the burden relies on the patient 100 to hunt through old credit card statements and/or bank statements and, once found, try to get that information to the provider. Ultimately the patient 100 or user could allow a medical provider, attorney or other entity access to their MEDspeedia account to verify transaction record, or the patient 100 could push this information archived in Medspeedia to a requesting entity.

Moreover, Medspeedia (or for that matter mapay.com) could provide a platform with which the patient contacts the medical provider to dispute, question or otherwise engage the provider about the amount due. In this manner, the present principles allow a dispute resolution mechanism to be set up and executed without the need for further intervention or interaction by mapay.com or Medspeedia. Additionally, Medspeedia or mapay.com, or a combination of these entities, could participate in or facilitate dispute resolution. The capability has not heretofore been available in the art. The Medspeedia app, as well as the mapay.com gateway can also be adapted to interface with, and to take a feed from all the various payment portals from all the individual providers' sites in order to have visibility of all of the PRPMBs that are currently due. This will allow the patient to efficiently track to pay all of the PRPMBs that are owed, even though they are serviced by different statement providers. Thus, Medspeedia and/or mapay.com integrate the payment requirements across many different platforms and providers, which has not heretofore been achieved in the art.

Additionally, if real time claims adjudication becomes reality, Medspeedia and mapay.com could act as an independent arbitrator for such adjudications. "Real time adjudication" is the notion wherein the total amount due for a medical provider's service (the insurance provider's part, the patient's co-pay, and other parts of the payment, for example the remaining part after the deductible for the year has been hit) is calculated and paid at the time the service is provided. Currently, it is not possible to achieve real time adjudication of the fee due. The mapay.com gateway and/or Medspeedia app could provide for a calculation of this amount, and apply a patient's stored credit card information to the bill for the real time payment. It may be that this payment is within a small difference of what is actually due, and so a final adjudication is undertaken later. In this case, the patient may be reimbursed for the small overpayment, or the medical provider given the remaining small amount due if there has been an underpayment after the real time amount is paid. The advantage here is that the medical provider receives payment earlier than normal and is not forced to hold the bill payment and lose a great deal of its money's time value. The patient will better understand their responsibilities when the adjudication is completed closer to time of occurrence, as in most day to day transactions. Thus, mapay.com and/or Medspeedia may also comprise a real time adjudicator module with appropriate software and hardware to implement real time adjudication and further payments reconciliation. This has not heretofore been achieved in the art.

The present principles also aid in other possibilities for healthcare management, and patient loyalty and rewards. Medspeedia or mapay.com could further facilitate patients timely submitting the PRPMBs by rewarding the patients for coming on and paying, for example with reward points, coupons, and other incentives. Medical providers could also be similarly rewarded for placing their statements on the mapay.com and Medspeedia. Yet a further module with appropriate software and hardware may be provided to mapay.com and/or Medspeedia to accomplish the incentive rewards.

Medical providers 120 may opt to pay a premium, similar to the way Google search prioritizes search ranking by paid sponsors. This would effectively move a provider's billing record to the top of the payable list on a patient's Medspeedia "payments due" screen. Government entities could also use the Medspeedia app 155 and website 158 on the patient side so that if healthcare entitlement payments come to the patient, the government payment entity (or for that matter even a private insurance company) could use Medspeedia 155 to transfer the payments. For example, a medical disability payment that a patient 100 receives as a result of an insurance policy or a government entitlement can be processed on the patient's Medspeedia account, and the patient could then pay their PRPMBs with this money through Medspeedia 155, 158, or even directly through the gateway mapay.com 90.

Figure 4:
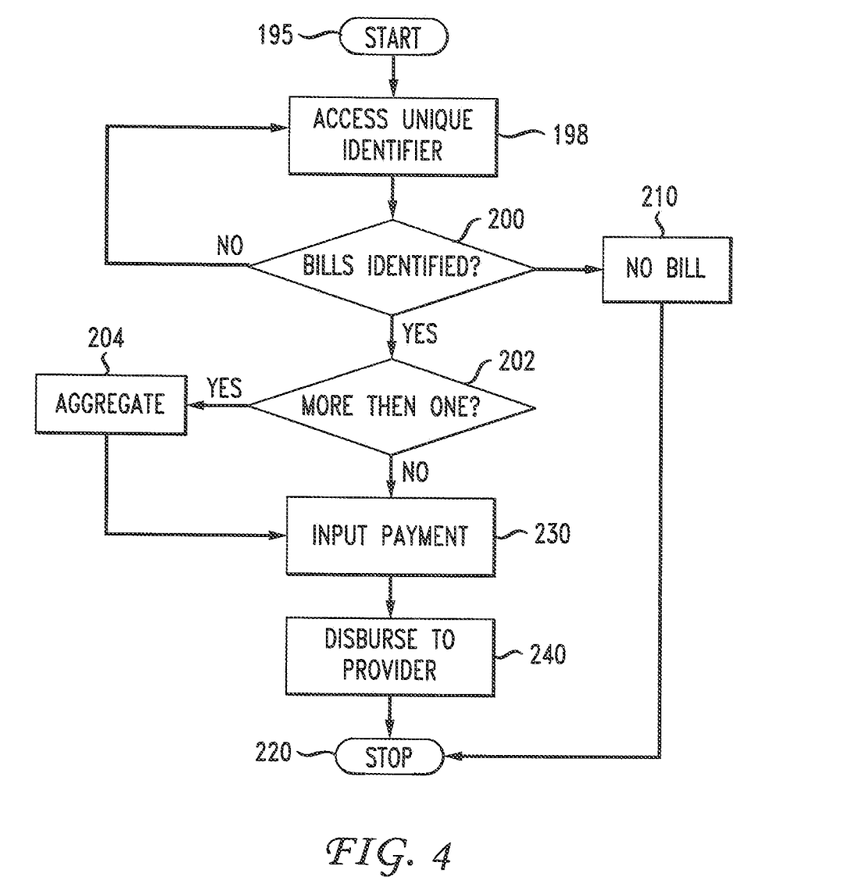
FIG. 4 is a flow chart preferred principles described herein.

Referring to FIG. 4, a flowchart of preferred methods of the present principles is illustrated. The method starts at 195, and at 198 accesses, or is given access to the unique identifier 80 or SmartTag 70. The method then determines at step 200 whether a bill for the patient has been identified. If not, then the method then either returns to step 198 to search new unique identifiers or SmartTags, or to verify the input unique identifier, for a specific number of attempts as set by the system, or determines at 210 then no bill exists for the patient so identified and so stops at 220.

If at some point it is determined that a valid bill for a patient having a PRPMB that is due, then at step 202 it is determined whether more than one provider must be paid a PRPMB with the patient's incoming payment. If so then an aggregation step as described above is implemented at step 204, and the payment input is accepted at step 230. If not, then only a single provider must be paid the PRPMB and, even if this is only a partial payment, the payment input is accepted by the system at step 230. All of these steps can be done either through the mapay.com gateway 90, or through the Medspeedia app 155 and medspeedia.com website 158, or through a combination of all three of these entities. Moreover, the mapay.com gateway 90, Medspeedia app 155, and medspeedia.com website or gateway could be owned and operated by separate entities, or all owned and operated by a single entity. After the payment is accepted from the patient or person paying the PRPMB on behalf of the patient at step 230, the medical provider or multiple medical providers are disbursed their payments by the gateway 90, Medspeedia app 155, or medpeedia.com website or a combination thereof.

One of the salient features of the universal payment portal of the present disclosure is that it provides versatile, consumer-centric and provider accepted platform for data gathering. This lends it well to the features of big data analysis, and also allows for interoperability across disparate platforms. Each of the parties using this portal derives their own value out of the network platform, and such value can reach many different needs of the different parties. Therefore, the data givers and recipients are aware of the gathering and use of the data so that the financial transaction can take place in MEDspeedia's universal and ubiquitous manner. Once all the billing information is received across the landscape of PMS vendors, MEDspeedia has then systematically and naturally created a way for all stakeholders to engage the MEDspeedia platform so that it can achieve interoperability for the industry.

Furthermore the platform network's utilization of blockchain would lead to the more efficient transfer of monies and in addition provide population health experts the ability to use reactive, dynamic (real-time) and predictive analysis to achieve better outcomes in all aspects of healthcare delivery, including both financial and clinical. Thus Medspeedia clearly provides big data analytics for the healthcare industry.

Another issue facing the industry has been the ability to adjudicate claims at the time of service, so that the patient and provider know immediately post-encounter what will be the financial responsibilities of the parties. Without having visibility across a patient's total household budgets and spending abilities, linked to payer policies, this could never happen and the network provides for this transparent visibility. On the clinical side, to determine best clinical courses of action based on data across disparate providers, for example to provide the ability to find those that are "doctor shopping" for opioids, the Medspeedia network provides the modality for big data analytics to achieve such outcomes.

Moreover, the gathering of consumer-centric data gives participants the ability to control and benefit from their own data and the MEDspeedia networks allow the participants (for example, patients) to band together and manage health benefits for themselves. To accomplish, the statement identifiers described herein can be mined and exploited to allow data about the patients to be gathered to, among other things, "de-identify" the patient so that the statements can be used without identifying the details of the patients by algorithms that can mine the data on the statements. This has myriad implications for both the patients' HIPPA concerns, as well as for payers and other users to obtain payments as well as information about the individual patients that is present on the statements independent of the patients' identities found in the individual statement identifiers. The mining provided my MEDspeedia thus provides a large amount of data and information to the payers and other users of the MEDspeedia while also protecting the patients' privacy and other rights. For example, the patients' debt can be tracked without exposing the patients' identify in this fashion.

The use of this kind of mining of the large amounts of data in the statement identifiers advantageously allows tracking of patient debt and other parameters independent of the statement identifiers and could simplify the statement by eliminating the need for an electronic SmartTag 70 as described above. The data mining provided herein allows for the creation of an internal identifier for the patients based on the raw data on the statements which would not be publicly available, but which would allow the managers of the MEDSpeedia networks and platforms to customize and use the patients' data to provide functions for the payers and other users. For example, the internal identifiers would allow the MEDspeedia platform to blockchain match payable for disparate vendors and reconcile the payments owed by many patients to the various vendors in a simpler reconciliation scheme managed by the MEDspeedia network. MEDspeedia reconciling the multitude of payments owed to multiple vendors by patients allows the reduction of duplicative payments to vendors with a more efficient net payment owed that has been determined by MEDspeedia and blockchain distributed.

This in turn would allow patients for example to login to the mapay.com website where the patents would find all of their transactions loaded across the various providers and where money is owed, and allow the patients and/or the mapay.com website to reconcile the payments with a single uploaded payment from the patient. In this way, the mapay.com and MEDspeedia network creates a Dynamic Distribution Ledger (DDL) which saves money, time and security in processing payments to various vendors owed by the patients. The DDL also ensures HIPPA and patient security concerns to be protected.

Figure 5:
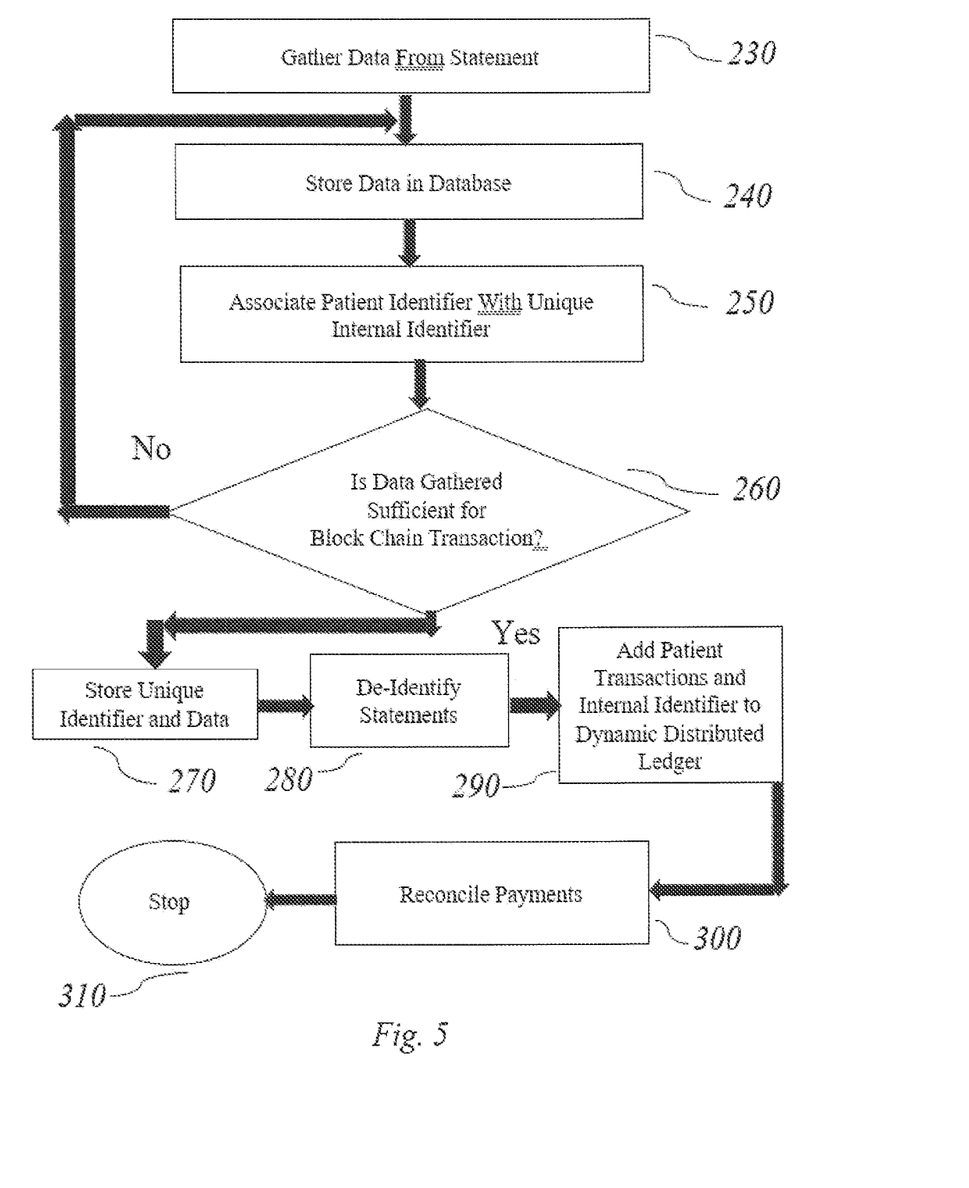
FIG. 5 is a flow chart of the creation of a Dynamic Distributed Ledger for blockchain distribution of payments in accordance with the present principles.

FIG. 5 illustrates a flow chart of a process for creating a DDL and providing blockchain payments to providers. Data from the various patient statements is gathered at step 230 and stored in a database at step 240. This data is then associated with the patient identifiers (70, 80) at step 250 with unique internal identifiers for each individual patient. The unique internal identifiers would not be generally available to the public, and are used simply for the blockchain transactions contemplated herein, and for other purposes that the patient data may find uses in.

A data sufficiency check is then performed at step 260 to determine if the data gathered for each patient is sufficient for the contemplated blockchain analysis to be undertaken by the system for ultimate funds disbursement. If not, then the method returns to step 240 for further data analysis of the statements and gathering of additional data which could come from sources other than the statements themselves. If so, then the process proceeds to step 270 wherein the unique internal identifier for each patient and the patient's data are associated together and stored. At this point, it is optionally possible to de-identify the patients' statements at step 280 by removing the statement identifiers and relying only on the internal identifiers for patient identification.

At step 290 it is then desired to create and populate the DDL by adding all of the patents' transactions which will be reconciled by the MEDSpeedia platform and accessed through mapay.com so that the patients can pay their healthcare bills and PRPMBs. Step 290 is accompanied by data reduction and analysis of each of the patients stored transactions and may also include a reconciliation of payments to common vendors for which multiple payments are due, and for which only a single payment, taking into account any credits already paid, would be a more efficient set of transactions. This also allows the MEDspeedia platform to more efficiently disburse single payments to the various providers taking into account all the monies owed from the various patients that have used MEDspeedia and mapay.com for service. The payments are then reconciled and disbursed at step 300 and the method ends at step 310.

Aspects of the present disclosure provide for data driven, evidence based decision making for dynamic diagnosis medical conditions through the data mining techniques described herein. Moreover, through block chain processing, it is possible to reconcile payments outside of the often restrictive and expensive checks and balances extant in the banking system today. While such checks and balances are laudatory for regulatory goals, they tend to raise costs and force players in the chain to adhere to unreasonable strictures which do not promote efficiency and predictability in payment processing. The techniques of the present disclosure allow the use of lock box functionality in financial transactions, which further allows the Medspeedia platform to share profit margin with the bank that ultimately move monies throughout the system, while allowing the system itself to be circumvented in certain efficient transactions. In so providing this functionality, Medspeedia can take part of the profit margin for providing these services and share profit margins with the financial institutions and banks to finalize and payment distribution, thereby creating a win-win situation for all of the parties involved including patients, physicians and other service providers.

Additionally the de-identified, internal identifiers also provide patients the ability to self-direct their patient identifiers for efficiency, data safety and data integrity. In this fashion the patients can "roll-up" or consolidate separate, disparate patient identifying information which may exist across many platforms, and in many forms. This will create a safe, self-directed patient identifier that the patient controls. This will be done through functionality provided by the Medspeedia platform, and can then be provided, with the patient's consent to other users of the self-directed identifier for block chain processing of payments, and the data driven medical diagnosis mentioned above. Medspeedia is ideal for collecting all of the different identifying information and creating the self-directed identifier. Medspeedia also is ideal for allowing the self-directed identifier to be used in block chain processing, which could also involve the use of cryptocurrencies.

The present principles lend themselves well to the new modalities of cryptocurrency for different applications hereinafter referred to as "CryptoTreasury". For example, in many industry's including healthcare there are multiple crypto currencies being offered and will continue in the future. To think first mover advantage will subjugate others could be true but there is also the case that multiple crypto's can and will serve the industry. For industry competitors in the healthcare market, such as Cigna and Aetna, each may want to have their own crypto but with the ability to link to an ultimate liquidity token vehicle called "Util Coin" which will easily transfer and transact. This would be known as a "Coin of Coins Health Utility Coin". This would allow for greater cooperation across companies while maintaining specific unique operating rules within their own token.

Additionally, Patient ID and authentication within the MEDspeedia self-directed portal for each individual's healthcare information is possible. It is the opt-in patient id that allows for MEDspeedia patients to direct all information from EHR and outside of EHR any data that might be important for contextual data analysis. For instance, information attained through answering an AI built information platform to gather data points such as, for example, how far from a playground a patient lives to provide a marker/predictor of the likelihood of exercising, allows for authentication of the patient's Universal patient id such that a universal patient intake form, which MEDSpeedia will manage, can be linked and authenticated across all boundaries to be available to any provider, whereby all the individual account numbers/patient id by provider can be rolled up to the their MEDspeedia patient ID. Authentication of this nature could form part of the patient's unique identifier.

This would also provide an Enterprise Stored Value for peers in the industry to be available, wherein a peer is, for example, a Self-Insured company, an insurance company, a governmental entity, and could include multiple payments to a provider from disparate entities. Patient encounter payments could be reconciled, and providers paid by pulling from Enterprise stored value and patient information. Also, multiple entities that are a party to one encounter could be paid simultaneously, such as an ER visit that produces multiple billing records from hospital, doctors, labs, imaging, etc. This can bypass most of the current banking system while allowing for preservation of direct deposits if so desired.

Importantly, it is possible to provide contextualizing of data to create Contextual Biomarkers which implement Spatial and Medical GIS Geography. MEDspeedia provides the contextual data then a Health HUB enables data from, e.g., Apple app, Fitbit and others. Clinic data whether derived from EHR's, PMS systems are just that; the clinical data with some demographics but no relevance/perspective with regard to environment, behavior, etc. Succinctly, this data lacks context. The health of a person is determined somewhat by clinical experience and hereditary, but the environmental; behavioral, societal factors are key to individual health as well as population health management. Interoperability goes beyond EHR's talking to one another or deriving the information within the ability to put in context. Adding the notion of overlapping Medical GIS "Geography" information as an element of the Health HUB, it is only with this quality of data that such systems will find relevance and efficacy. This will also prevent natural data skewing when only a single source of this kind of data is available.

Advantageously, the use of Smart Contracts utilizing the Medspeedia cryptocurrency and token (MEDspeedium token) will greatly enhance the utility and effectiveness of current SmartContract technology. By building Smart Contracts with Medpeedium tokens, the multiple parties to a healthcare encounter will be reconciled and paid through the transparency and validation of mining of the cryptocurrency. This will provide nearly real time claims adjudication. Patients may also receive rewards for their information which can be paid in currency and/or tokens. By providing the spatial contextual data and since MEDspeedia will be successful at providing the most valuable rich data set, the remuneration back to the patient id is allowable by utilizing current currency, rewards, and crypto currency such as MEDspeedium.

Today there exists a legacy banking system that allows money to flow from third party payors, e.g. insurance companies, to providers, and also patient to payors. By example a patient pays a bill for medical service by way of sending a check through the mail to a PO Box that is serviced by Treasury Services by a bank or other service company. The bank will process the payment and provide the deposit to the providers receiving bank account in 3-5 business days, the MApay platform exists whereby the utilizing crypto and blockchain DTL Distributed Ledger Technology when the patient makes a payment the process will traverse the current banking system though a universal platform and gateway. Even when multiple individual sites, either at the bank level or provider level, the portal MApay will be sit on top of the industry for processing. Upon payment it will bypass the current Treasury Services and then the token or currency could process to the receiving bank immediately. The Medspeedium token provides a smooth disruption of Banking Treasury Services relative to health care payments, which will provide liquidity, transparency and efficiency not heretofore been seen in the art.

Other modalities utilizing Medspeedium tokens and cryptocurrencies are also available. For example, a MEDspeedia user/adopter may be given access to a MEDspeedia card and virtual wallet. This may provide a value to a linked account or MApay stored value, fiat or crypto, as well as linkage to a credit card or debit account, tied to a MEDspeedia credit card offering, stored MEDspeedium tokens, or access to other crypto, an auto-exchange payment methods if a merchant does not accept particular alternate types of currencies. For instance, if a user is shopping at Walgreens for example and the MEDspeedia holder needs to exchange MEDspeedium or other currency with Walgreens which uses its own closed crypto environment or currency, the Medspeedia card may be used.

This could include a person to person transaction either verbally with a live clerk, or as a series of prompts on a payment screen wherein in addition to a form of payment being "debit, credit, cash", etc, a MEDspeedium options would be made available. In this fashion, as well as with other use of the Medspeedium card, patient id authentication would provide access to all patient side financial and clinical information if the patient/consumer so desires.

As will be appreciated by those skilled in the art, the systems, apparatus and methods described herein can be implemented in hardware, software or firmware, or combinations of these modalities, in order to provide flexibility for various environments as discussed throughout this disclosure. Application specific integrated circuits (ASICs), programmable array logic circuits, discrete semiconductor circuits, processors configured to perform inventive functions, and programmable digital signal processing circuits, computer readable media, transitory or non-transitory, among others, may all be utilized to implement the present invention. These are all non-limiting examples of possible implementations of the several preferred embodiments of the present principles, and it will be appreciated by those skilled in the art that other embodiments may be feasible.

In the healthcare payment field, there is a need for cross-border international and intra-state movement of currency particularly when medical care is provided outside a patient's home country. For instance, if a patient resident in Bermuda has a debilitating disease, often they will have care provided by a leading healthcare institution in the United States. Payment for these kinds of cross-border healthcare transactions are costly and cumbersome and are accomplished by an international network of banks and intermediaries, including Swift and corresponding banks in accordance with complicated contractual relationships.

Using the distributed ledger technology described herein, a localization of matched transactions can be performed which use legacy pathways for the amounts and accounts that cannot be matched. For instance, if there are 10 transactions today that are being initiated in the direction from one jurisdiction to another and nine the other way, these transactions can be linked and satisfied from the number of transactions as well as the corresponding amount of currency/value to satisfy the overall transaction volume. Only the single transaction and net amount need be accounted for and moved across jurisdictions, while all other transactions may be satisfied in multiple, real-time ledger movements. These movements may be validated by the system and the parties through other algorithms and which can be throughput between an initiator and receiver.

Another issue that arises in healthcare transactions is understood in the context of financial risk particularly as such risk is priced into the market. Since different types of financial risk are valued differently, intermediary mechanisms have been developed to aid in mitigating differing risks as necessary. The pricing of credit cards or the foreign exchange risk on an international transaction, or the risk associated with a party actually living up to their end of the bargain is often undertaken by the party undertaking the risk with an insufficient level of information required to accept the risk. This type of risk exists for many goods and services in healthcare. For instance, during the flow of pharmaceuticals to a party and the risk associated to the paying party, government or insurance carriers, often the drugs are shipped on the promise of satisfaction by a payor of the. The present disclosure relating to smart contracts provides a "HumanCare Escrow" which is a party specific, smart contract and permissions visibility to a trade of goods along with a visibility and encumbered escrow utility to pay for those goods.

Additionally, international clinical trials is another good example of occurrences of risk associated with timing of payment which invokes a time value for the risk as well as foreign exchange currency risks which can lead to a large financial overhead cost to the transaction. The HumanCareEscrow agent smart contract will aid in mitigating these types of risk by providing a vehicle for these transactions that injects known level of risk which can be recognized by both parties before the transaction is undertaken.

As has been discussed throughout the present disclosure, the introduction of an alternative digital asset currency can be shown to have profound impact on the movement of utility to reconcile a transaction, for example the use of Bitcoin and most recently the JPM coin backed by JPMorgan and the Libra introduced by Facebook. Unlike government backed currencies that have a perceived full faith and credit regardless of the amount of the currency, currently digital currencies do not necessarily enjoy this type of trust. Outside of this kind of well-understood trust, in digital currencies there must be exchangeability for a transaction to be agreed upon with stability. Digital asset currency introduction has been structured heretofore to be backed by a set of assets pulled to represent a basket of assets such as cash, bonds, etc. The present subject matter recognizes that a marketplace can self-underwrite the digital asset currency.

In the example of the global healthcare market which is close to $10 trillion dollars wherein the US makes up nearly 30% of this market, these transactions are made between payers and providers on behalf of patients which are also considered payors for their out of pocket (PRPMB) obligations. The present subject matter provides a network of pooled commitments that have been already set aside and/or available to pay for procedures that have an agreed upon price and an authorization/agreement to have the service provided. The present subject matter provides a "HumanCare Global Collateralization Basket" (HC2B) that will be comprised of pledges of already agreed to monies in fiat or alternative currencies to satisfy future transfer of payments to reconcile healthcare encounters. These transfer payments will be encumbered and adjudicated either by way of standard adjudication processes or smart contracts.

Unlike the other stable currencies whereby corporate hard assets are used as collateral or a pool of other tangible currency from the participants, in Facebook's case a $10 million entry fee, the HC2B will be structured by marketplace participants in pre-agreed upon transactions. This will provide the marketplace itself with trust, participation, liquidity, fluidity and achieve a reduction in cost, as well as increased transparency and speed to transactions. Parties could also pre-pay into the basket to get services at a discount through a financial mechanism derivative that would, in conjunction with the HC2B, support an exchange of value that could fluctuate. The HC2B could also be used as a speculative vehicle for investment purposes, which will aid in powering industry participation and acceptance. This will further allowing consumers and the global community to reap rewards according to how well the derivative asset has performed.

The current cost of some drug treatments is unsustainable under the current payment models, especially as is related to some personalized medicine protocols. Today, payors sit at one side of the table and the manufacture at the other, while the patient in the middle. The payors want costs lowered, the manufacturers want to keep costs high, and the patients just need the treatment. Discount structures and one-off arrangements are sometimes available to balance these competing factors, but will not satisfy the demand going forward. A network of risk adjudication and compliance enjoyment must be put forth to satisfy these industry and global challenges. By putting these patients in a risk pool of treatments across all drugs that are in this category, a securitization of the future payment can be guaranteed by the payors. Investors, which may include life insurance companies because of their desire to have patients live longer, will be interested in this kind of outcome. Additionally, a patient compliance tool will be deployed for the patients, wherein patients will be rewarded and also disciplined based on their compliance.

Today funding grants for research come from both public and private sectors. The overhead and administrative costs associated with this funding can be as much as 40-60 percent of the funding. Smart contracts and the flow of a digital asset currency can reduce these costs drastically. Also the need to follow the IP contribution from individuals and institutions to the value and recognition they provided to these efforts must be memorialized and able to be remain intact regardless of future movement of employment, dollars, or other factors involved in the activity. Once there is a marketplace acceptance, an understanding of the deal renumeration must be reconcilable by the network and satisfied through the transference of utility to the rightful person(s), institutions, and company(s).

There exists today an electronic healthcare exchange within the drug retail business. This was established by an industry coalition of separate parties and is called Surescripts. Surescripts provides the ability for e-prescribing according to a provider's direction a prescription that can be sent electronically to the pharmacy of choice for the patient. Also today at the prescriber's office Surescripts provides the ability to have the out of pocket responsibility to be communicated to the patient at the time of prescribing. The average out of pocket cost today is about $75.

There are 5.2 million e-scripts a day in the US alone. There is an abandonment rate of 10-12% of prescriptions, which in they use amounts to several hundred thousand prescriptions lost daily. The root cause of this abandonment could be that the patient does not believe will work, or financial since the patient cannot afford the out of pocket cost. This abandonment rate comes at a heavy cost to the industry, such as the retailer, that has already filled the prescription and has incurred the cost, labor and inventory overhead. Also, since due to abandonment the patient does not take his or her prescribed medications, bad outcomes increase the ultimate spend realized by the payers for the patient's treatment.

The MAPay network can drive lower abandonment occurrences to move the real point of sale/engagement to where it should be such that the patient acknowledges at the point of prescription, the provider's office, or any other place or modality from which a prescription is provided that he or she is going to receive and take the medications and be responsible for the out of pocket costs associated therewith. To achieve this, MAPay will encumber and escrow from pre-establish sources of funds at the real point of service to ensure payment. Moreover, the MAPay network itself can engage in the transactions itself and assist or provide prescriptions through a licensed provider. In any event, once the prescriptions are picked up or delivered then the funds will be released. This will greatly reduce the incidents of abandonment and the costs associated therewith. Moreover, MAPay will store and reconcile these payments as required.

A mentioned above, one of the salient features of the universal payment portal of the present disclosure is that it provides versatile, consumer-centric and provider accepted platform for data gathering. This lends it well to the features of big data analysis, and also allows for interoperability across disparate platforms. Each of the parties using this portal derives their own value out of the network platform, and such value can reach many different needs of the different parties. Therefore, the data givers and recipients are aware of the gathering and use of the data so that the financial transaction can take place in MEDspeedia's universal and ubiquitous manner. This also clearly provides advantageous results in the online data gathering aspects of the present disclosure as it relates to the COVID-19 pandemic.

Moreover, as discussed above aspects of the present disclosure provide for data driven, evidence-based decision making for dynamic diagnosis medical conditions through the data mining techniques described herein that is also particularly beneficial to the COVID-19 crisis. As also discussed previously, Patient ID and authentication within the MEDspeedia self-directed portal for each individual's healthcare information is possible. It is the opt-in patient id that allows for MEDspeedia patients to direct all information from EHR and outside of EHR any data that might be important for contextual data analysis, which is especially critical in the COVID-19 pandemic. For instance, information attained through answering an AI built information platform to gather data points such as, for example, how far from a playground a patient lives to provide a marker/predictor of the likelihood of exercising, allows for authentication of the patient's Universal patient id such that a universal patient intake form, which MEDSpeedia will manage, can be linked and authenticated across all boundaries to be available to any provider, whereby all the individual account numbers/patient id by provider can be rolled up to the their MEDspeedia patient ID. In this fashion the additional information gathered from a patient in diagnosing potential coronavirus exposure for COVID-19 illness can be referenced to the patient's prior information that was already gathered.

To achieve these important, salutary results, the present disclosure allows access to consumer/data capture for healthcare providers through secure online and mobile methods, via QR codes, text and weblinks. This provides a digital medical data screening that is dynamic and easily adapted and customized to healthcare providers, hospitals, institutions, government agencies, physician practices and country government and borders. The screening questions created in the online forms can be created with smart intelligence tools to flag or escalate certain responses, in order to evaluate or identify clusters or predetermined selected patterns. This will all be accomplished by the MEDSpeedia platform with enhanced data gathering capabilities. Such results have not heretofore been achieved in the art.

There have thus been described certain preferred embodiments of methods and apparatus for healthcare universal patient payment gateways. While preferred embodiments have been described and disclosed, it will be appreciated by those with skill in the art that modifications are within the true spirit and scope of the described principles.

What is claimed is:

1. A method of creating a dynamic ledger for, comprising:
gathering patient related data from a plurality of statements which identify patients with patients' unique patient identifiers;
creating unique internal identifiers for each of the patients having unique patient identifiers;
determining whether the data gathered for each patient is sufficient for block chain transactions;
when the gathered data is sufficient for block chain transactions, de-identifying each of the patient statements to remove data related to patient identity in the statements;
adding patient transactions and internal identifiers to a database, wherein the database is dynamically modifiable to accept new patient data when it is identified that new patients have statements that are capable of block chain transactions; and
offering to the patient an opt-in patient id that allows the patient to direct information important for contextual data analysis about the patient to a data analytics platform.

2. The method of claim 1, further comprising consolidating separate, disparate patient identifying information which may exist across to create a self-directed patient identifier that the patient controls.

3. The method of claim 2, further comprising contextualizing of the data to create contextual biomarkers which implement spatial and/or medical geography.

4. The method of claim 3, further comprising providing access to patients of an enterprise stored value (ESV) in the block chain transaction to allow the patient to pay for medical services through the ESV.

5. The method of claim 4, wherein the value of the ESV is a crypto-currency.

6. The method of claim 5, wherein the crypto-currency is accessed through a virtual wallet and/or a unique credit card.

7. The method of claim 6, further comprising authenticating the patient's identity in the block chain transaction.

8. A system for creating a dynamic ledger for, comprising:
a memory; and
a processor that is configured to receive data from the memory for processing, the processor being further configured to:
gather patient related data from a plurality of statements which identify patients with patients' unique patient identifiers;
create unique internal identifiers for each of the patients having unique patient identifiers;
determine whether the data gathered for each patient is sufficient for block chain transactions;
when the gathered data is sufficient for block chain transactions, de-identify each of the patient statements to remove data related to patient identity in the statements; and
offer to the patient an opt-in patient id that allows the patient to direct information important for contextual data analysis about the patient to a data analytics platform.

9. The system of claim 8, wherein the processor is further configured to consolidate separate, disparate patient identifying information which may exist across to create a self-directed patient identifier that the patient controls.

10. The system of claim 9, wherein the processor is further configured to contextualize the data to create contextual biomarkers which implement spatial and/or medical geography.

11. The system of claim 10, wherein the processor is further configured to provide access to patients of an enterprise stored value (ESV) in the block chain transaction to allow the patient to pay for medical services through the ESV.

12. The system of claim 11, wherein the value of the ESV is a crypto-currency.

13. The system of claim 12, wherein the crypto-currency is accessed through a virtual wallet and/or a unique credit card.

14. The system of claim 13, wherein the processor is further configured to authenticate the patient's identity in the block chain transaction.

15. A crypto-currency processor which is adapted to receive data from a memory concerning crypto-currencies and for creating a dynamic ledger for, comprising:
an interface for communicating with the memory; and
a processor that is configured to receive data from the memory for processing, the processor being further configured to:
gather patient related data from a plurality of statements which identify patients with patients' unique patient identifiers;
create unique internal identifiers for each of the patients having unique patient identifiers;
determine whether the data gathered for each patient is sufficient for block chain transactions;
when the gathered data is sufficient for block chain transactions, de-identify each of the patient statements to remove data related to patient identity in the statements; and
offer to the patient an opt-in patient id that allows the patient to direct information important for contextual data analysis about the patient to a data analytics platform.

16. The system of claim 15, wherein the processor is further configured to consolidate separate, disparate patient identifying information which may exist across to create a self-directed patient identifier that the patient controls.

17. The system of claim 16, wherein the processor is further configured to contextualize the data to create contextual biomarkers which implement spatial and/or medical geography.

18. The system of claim 17, wherein the processor is further configured to provide access to patients of an enterprise stored value (ESV) in the block chain transaction to allow the patient to pay for medical services through the ESV.

19. The system of claim 18, wherein the value of the ESV is a crypto-currency.

20. The system of claim 19, wherein the processor is further configured to authenticate the patient's identity in the block chain transaction.

* * * * *